No. 726,351. PATENTED APR. 28, 1903.
S. ROGOZEA.
SAFETY DEVICE FOR RAILWAYS.
APPLICATION FILED DEC. 29, 1902.
NO MODEL. 10 SHEETS—SHEET 5.
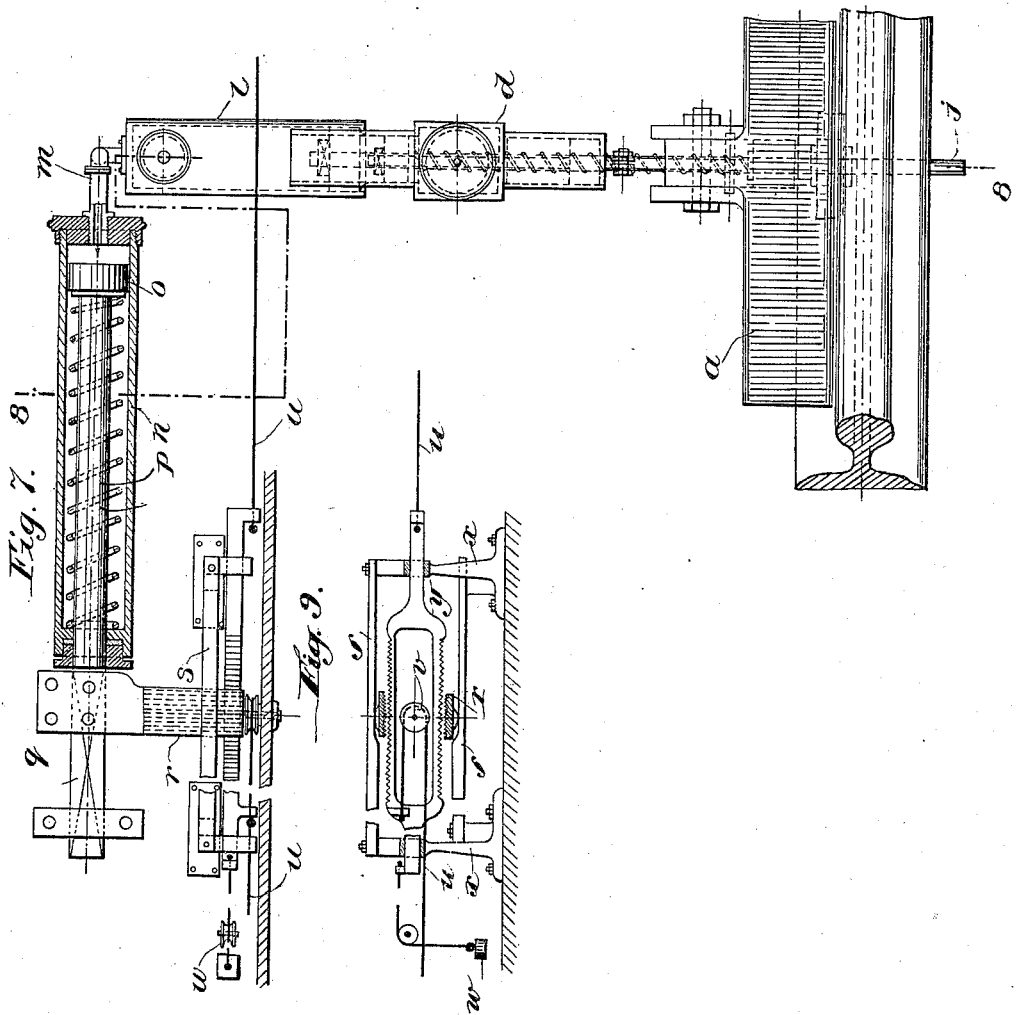
WITNESSES.
Anna P. McCole
Margaret Smith
INVENTOR.
Sava Rogozea
By his attorney,
Edward P. Thompson

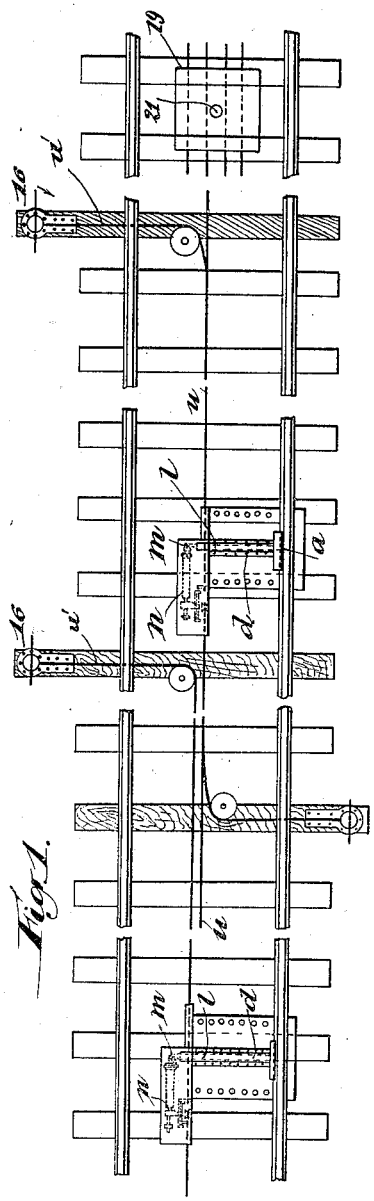

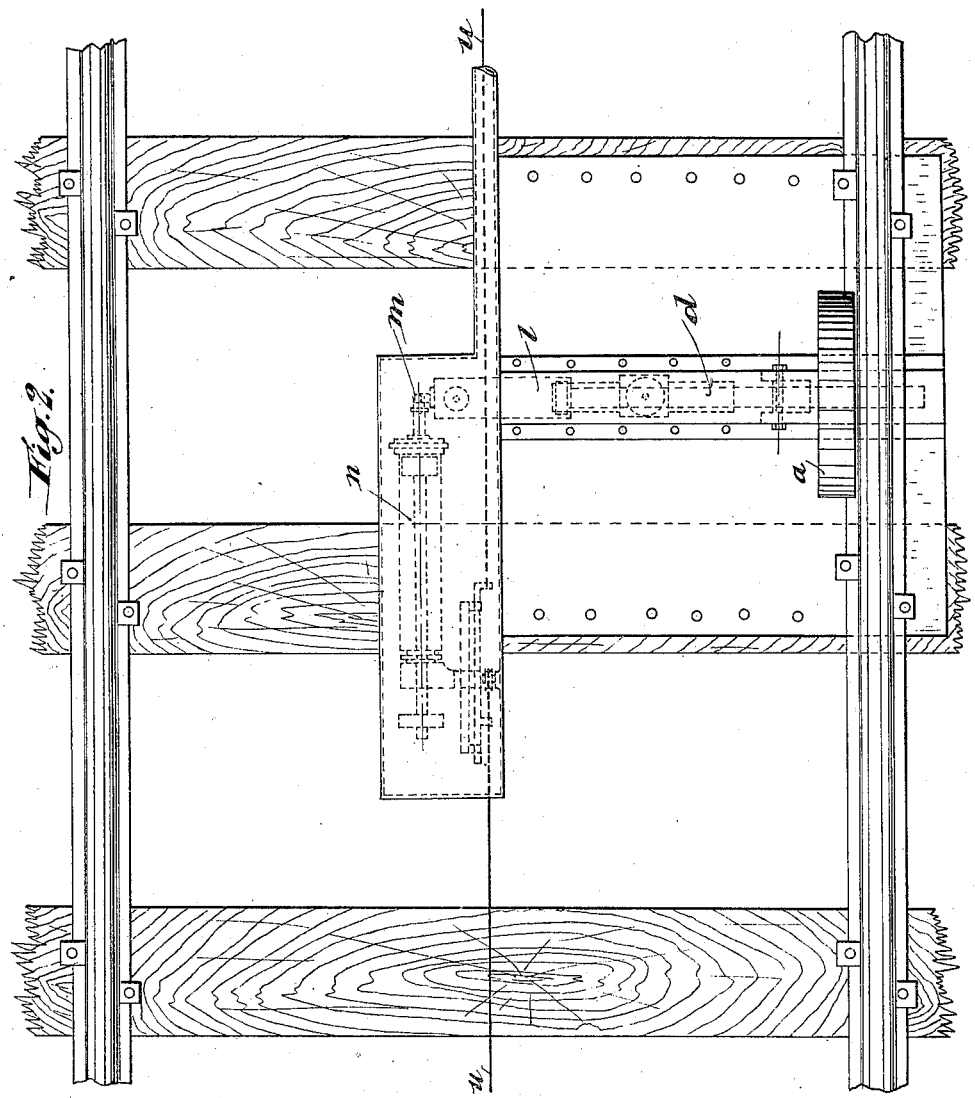

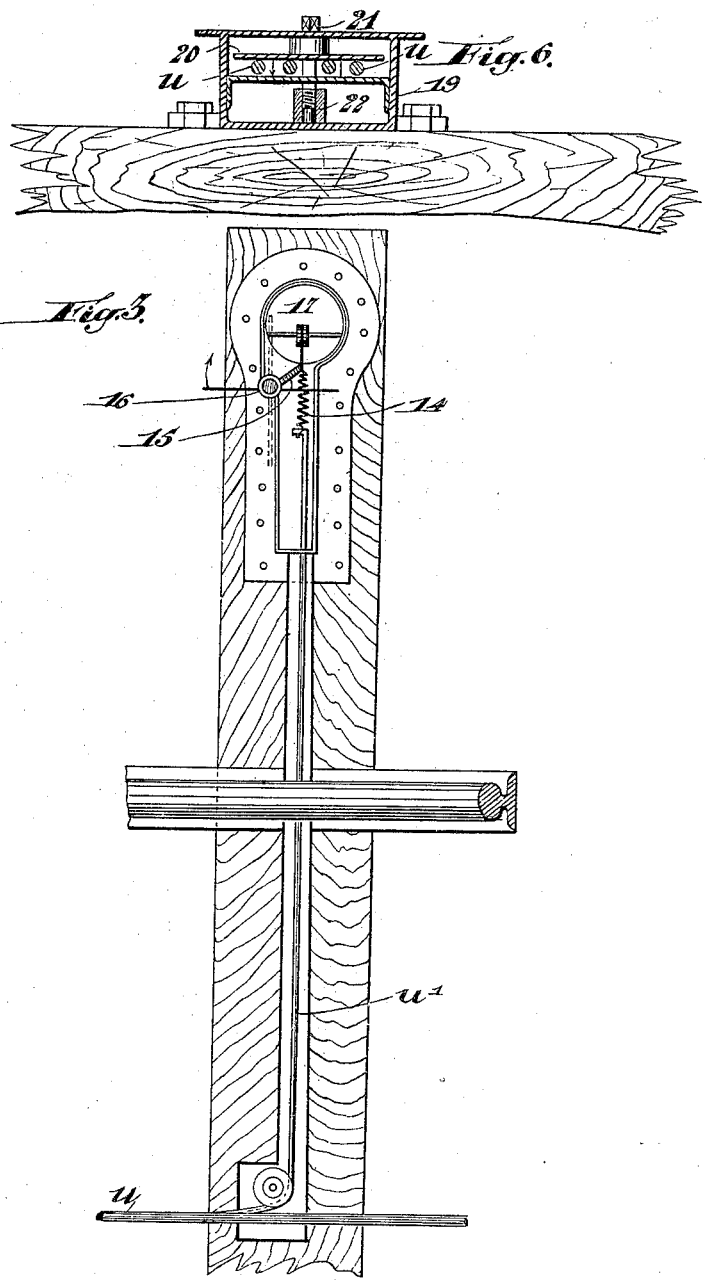

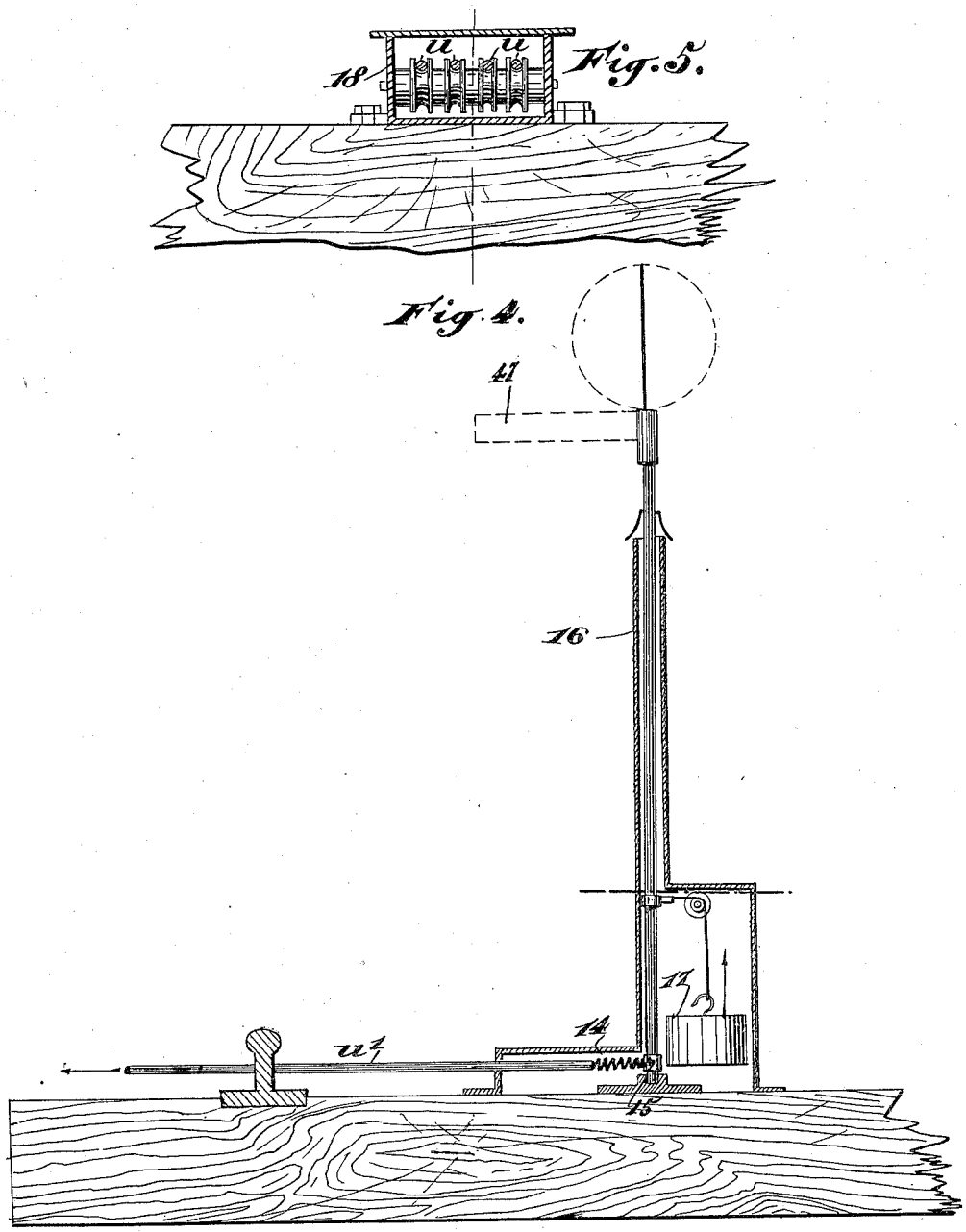

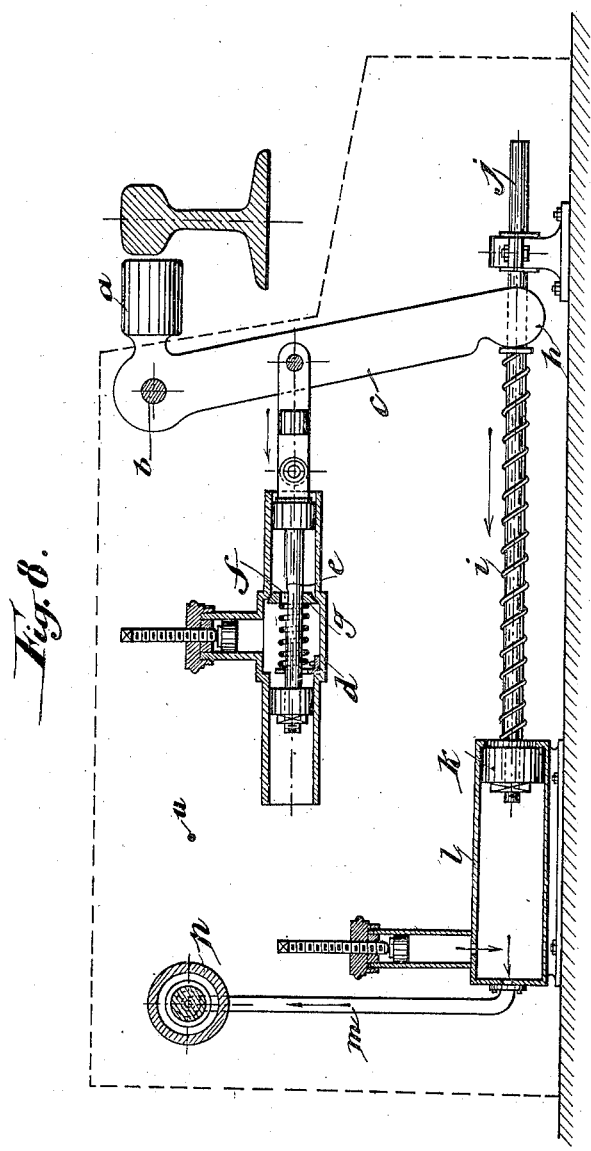

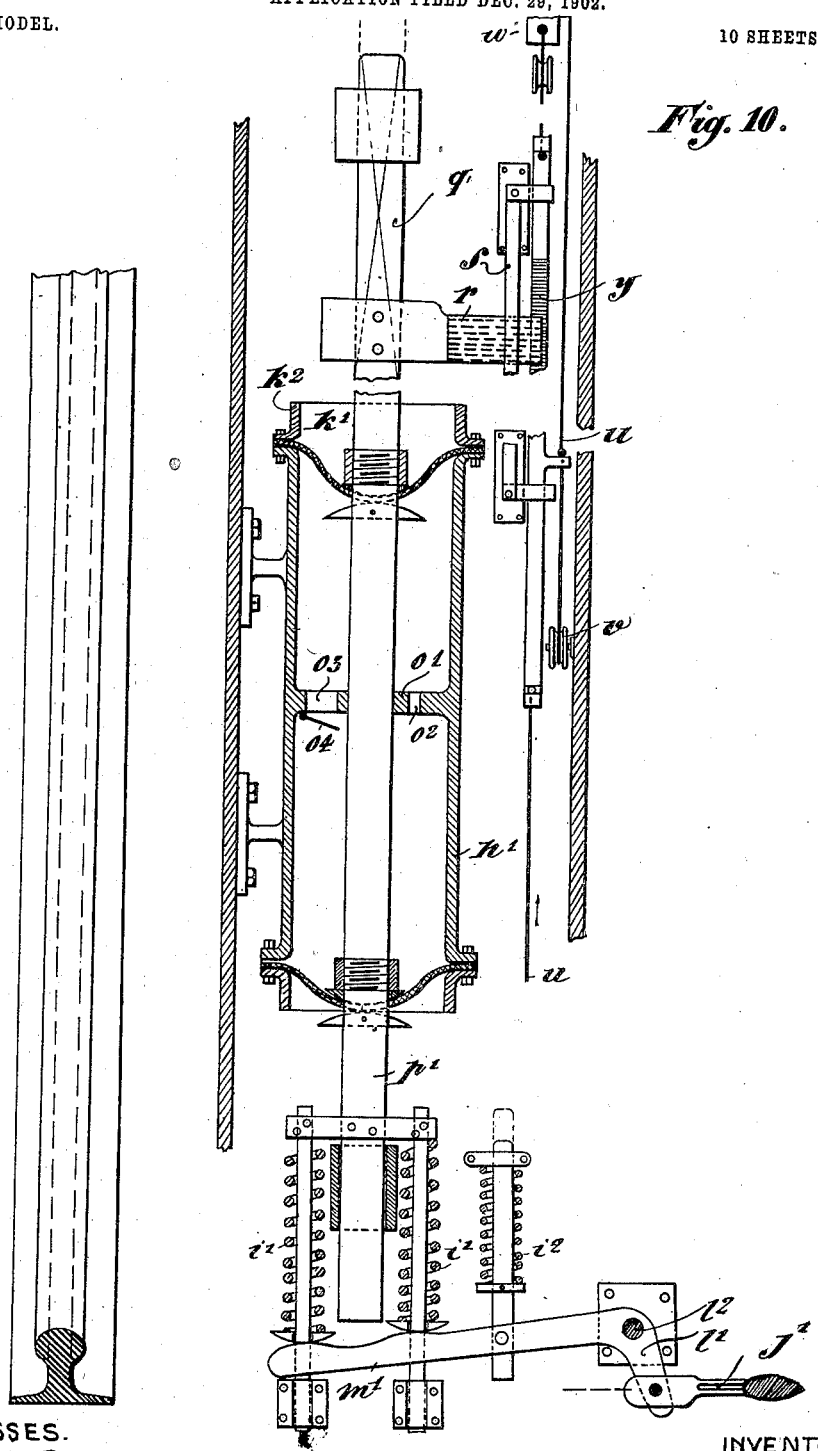

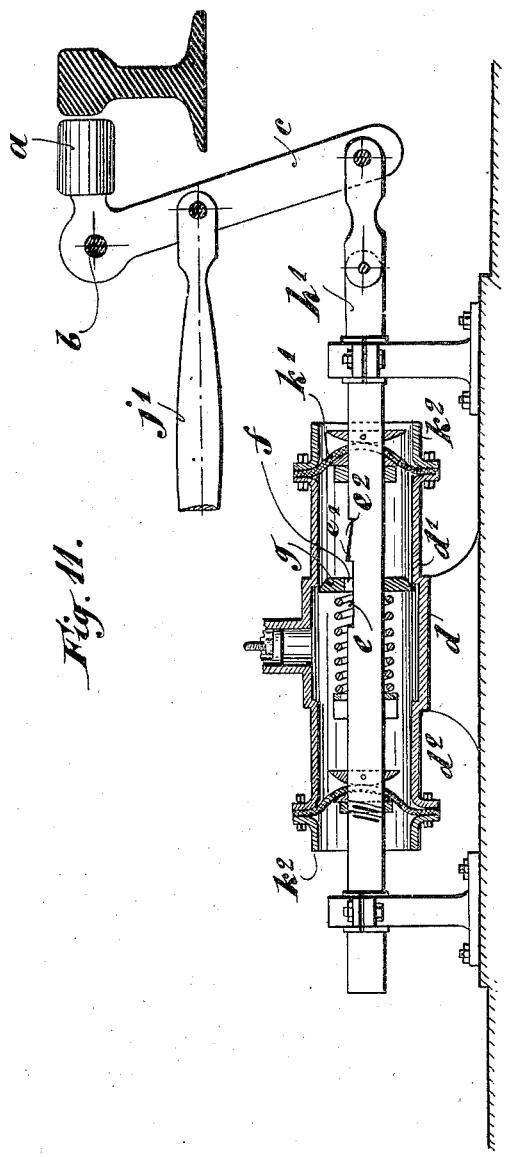

No. 726,351. PATENTED APR. 28, 1903.
S. ROGOZEA.
SAFETY DEVICE FOR RAILWAYS.
APPLICATION FILED DEC. 29, 1902.
NO MODEL. 10 SHEETS—SHEET 9.
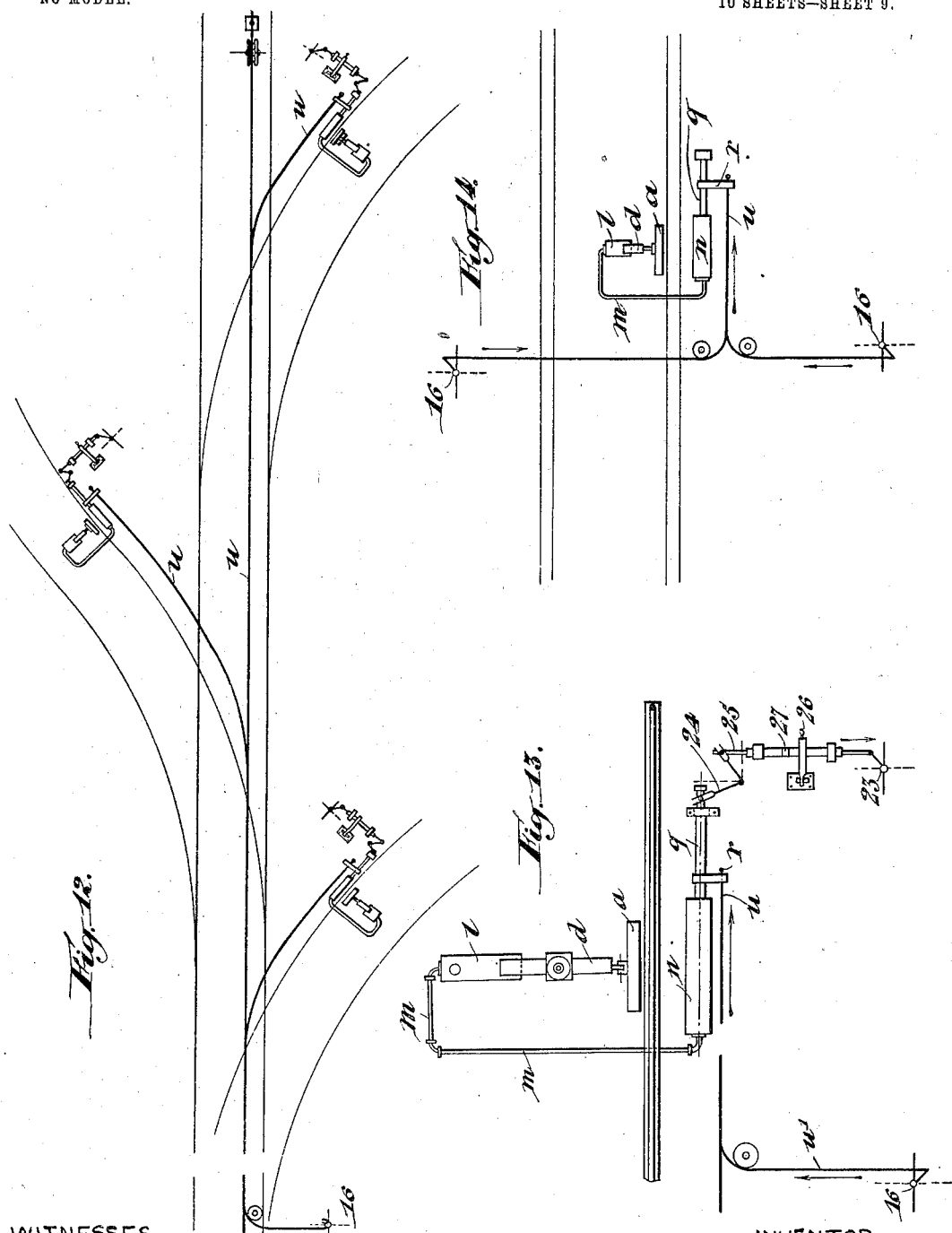
WITNESSES. INVENTOR.
Sava Rogozea
By his attorney,
Edward P. Thompson No. 726,351. PATENTED APR. 28, 1903.
S. ROGOZEA.
SAFETY DEVICE FOR RAILWAYS.
APPLICATION FILED DEC. 29, 1902.
NO MODEL. 10 SHEETS—SHEET 10.
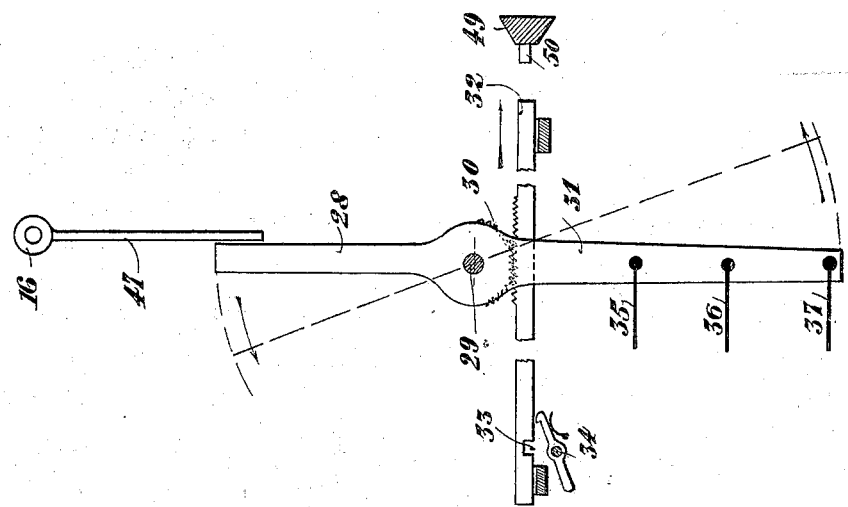
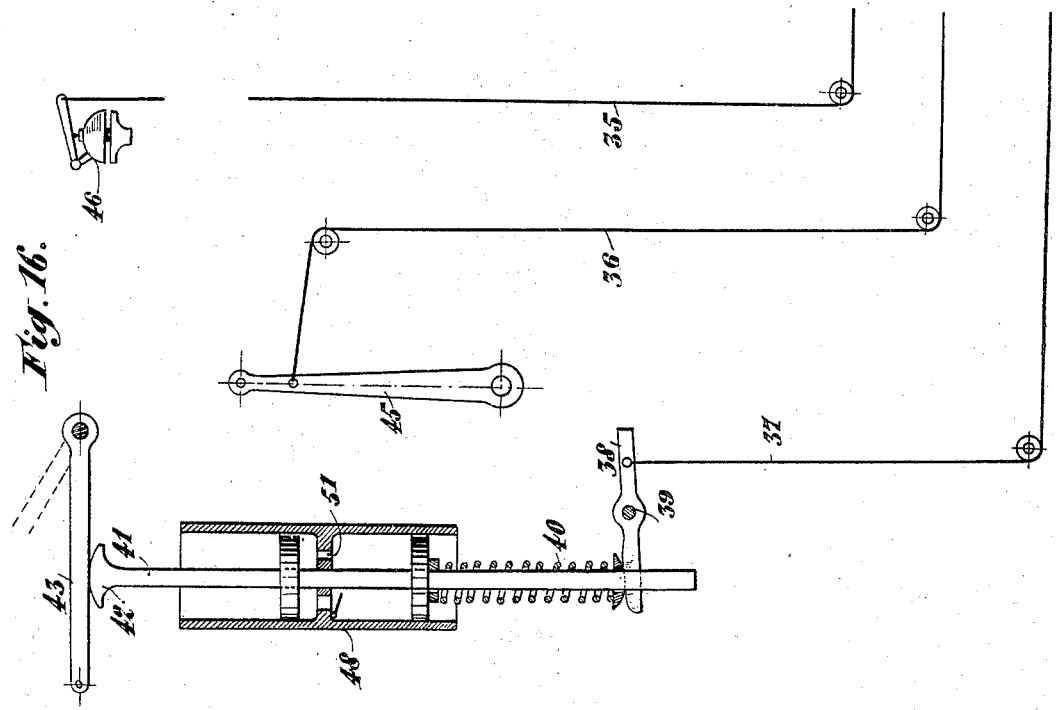
WITNESSES. INVENTOR.

UNITED STATES PATENT OFFICE.

SAVA ROGOZEA, OF BRUSSELS, BELGIUM.

SAFETY DEVICE FOR RAILWAYS.

SPECIFICATION forming part of Letters Patent No. 726,351, dated April 28, 1903.

Application filed December 29, 1902. Serial No. 137,061. (No model.)

*To all whom it may concern:*

Be it known that I, SAVA ROGOZEA, technician, a subject of the King of Roumania, residing in Brussels, in the Kingdom of Belgium, (whose full postal address is 17 Rue du Collège, Brussels, aforesaid,) have invented certain new and useful Improvements in Safety Devices for Railways, (for which application has been made in Great Britain, No. 18,676, dated August 25, 1902; Belgium, No. 164,774, dated August 21, 1902; France, dated August 21, 1902; Germany, dated November 5, 1902; Austria, dated November 6, 1902,) of which the following is a specification.

This invention relates to certain safety arrangements for enabling any train traveling on a main line or shunting on branch lines to be automatically protected either behind or in front or in both directions and for always maintaining a following train or one approaching in the opposite direction at a given distance sufficient to prevent any collision or overtaking or the like, even in the event of the driver failing to notice the "stop-signals" or the like. These mechanical devices, the combination and arrangement of which vary according to different cases in practice and the places on the track where they are to be placed, thus constitute by their combination an absolutely efficacious system of protection, requiring no special staff to operate them, and constitute an improvement in the working of railways.

The system comprises, first, a pedal arrangement operated suddenly on the passage of a train, but combined in such a manner as to progressively and without shock produce a pull on a wire or cable operating one or more distant stop signals or disks covering the train in one direction or the other or in both directions simultaneously; second, a hydraulic brake, self-releasing in time, combined with the preceding arrangement, and having for its object to maintain the disk or disks just brought into the stop position in this position for a sufficient time after the train has passed over the pedal to enable the said train to cross the section of line protected by said disks, the pulling off of said stop-signal and its return to the position indicating "line free" being produced only when this section of line is supposed to have been traversed by the train; third, an automatic arrangement of counterweights or springs for maintaining the normal tension of the wire or cable operating the disks and for compensating for expansions of said wire; fourth, an arrangement for enabling the train officials to block the protecting signals or disks at a distance in the stop position when the said train is in distress or must for any cause come to a stand on a section of line protected by said disks; fifth, a semi-automatic arrangement, more particularly applicable to sidings, by means of which the disk or disks of the section of adjacent main line are closed or blocked automatically at a distance when the shunting train reaches the said main line, the unblocking having to be effected by hand by the head shunter when the main line is again free; sixth, an arrangement for producing the automatic stoppage of the train in case the driver does not observe the signals when the latter are at "danger."

In order to allow of the description being better understood, a brief reference will now be made to the accompanying drawings, in which—

Figure 1 is a section of the principal track for a single line fitted on this system. Fig. 2 is a view, on an enlarged scale, of the general arrangement of the pedal mechanism which operates the cable or wire connected to the signals. Fig. 3 is a plan view showing the method of operating the signal. Fig. 4 is a view of the same in transverse section. Fig. 5 is a transverse section of one of the pulley-boxes placed at intervals along the track for supporting and guiding the signal-wires. Fig. 6 is a transverse section of the arrangement for blocking at a distance the signals governing a section in case the train has met with an accident or is kept standing in this section. Fig. 7 is a plan view, partly in horizontal section, showing the pedal arrangement for throwing the mechanism into action with a brake for bringing it out of action, enabling the pulling of the signal-wires to be elastically effected by the hydraulic transmission of the movement of the pedal. Fig. 8 is a transverse section of the preceding arrangement on the line 8 8 of Fig. 7, showing the mechanism for the elastic operation of the system by the pedal, as well as the means for bringing it out of action in time, which temporarily blocks the protecting-signals as soon as the latter have been closed by the passage of the train. Fig. 9 is an elevation and vertical section of a part of the mechanism for pulling on the cable, which mechanism comprises a device for compensating for expansion or contraction of the wire. Fig. 10 is a plan view and horizontal section showing a modification of the arrangement for elastically operating the mechanism with a hydraulic buffering arrangement for gently effecting the pulling of the signal-wire by an exclusively mechanical transmission of the sudden movement of the pedal. Fig. 11 is an elevation and partial vertical section of the releasing-brake device and the pedal which operates the mechanism shown in the preceding figure. Fig. 12 is a diagram of the semi-automatic method of equipping the track for protecting branch or shunting tracks. Fig. 13 is a plan view, on an enlarged scale, of the arrangement of the parts in this case. Fig. 14 is a simplified arrangement for an ordinary track not having a distance-signal, but only a home signal on each side of the track. Fig. 15 is a plan view of the part adapted to the locomotive intended to be engaged, if necessary, by the arm of the signal with a view to producing the automatic stoppage of the train and warning the driver; and, finally, Fig. 16 shows a method of transmitting the movements of the part hereinbefore mentioned for operating the devices for stopping the train.

In order to automatically operate the closing and temporary bringing into action of one or more of the advanced disks, the mechanism comprises a pedal $a$, mounted to pivot on the flange side of the rail and having a depending arm $c$, which is connected with a hydraulic brake $d$ for regulating the release (on the system already described in my previous patent, No. 702,593) and with the piston-rod $j$ of a force-pump $l$, Fig. 8, so that when the pedal is depressed the liquid in the pump is forced through the pipe $m$ into a second cylinder $n$, Fig. 7, thus causing the piston $o$ in this second cylinder to advance against the pressure of a spring, and the rod $p$ of this piston $o$ pulls the wire operating the protecting-disks. The depression of the pedal being effected suddenly when a train passes over it, it is of importance to be able to convert this sudden movement of the pedal $a$ into a progressive movement of the second piston $o$ in order that the traction on the wire of the signal-disks shall take place without jerk and without the danger of straining or breaking said wire and the apparatus which it operates. For this object the forked end $h$ of the depending lever $c$ of the pedal actuates the piston $k$ of the first cylinder through an interposed spiral spring $i$, which surrounds the piston-rod $j$ and which is sharply compressed in order to cause the piston $k$ to progressively advance, Fig. 8, thus also moving forward the piston $o$ of the second cylinder $n$, Fig. 7, which in this way slowly draws out the wire $u$, which is connected to the piston-rod $p$, as will be hereinafter described.

The outer end of the piston-rod $p$ is guided in a suitable support and has a square part on which a double-jawed spring-steel grip $r$ is fixed. The jaws of this grip are toothed and are guided longitudinally in a slide, the bars $s$ of which are nearer to one another toward one end, Fig. 9, so that when the piston $o$ progressively advances the toothed jaws $r$ approach one another in order to grip and carry with them a rack $y$, placed between them and to the ends of which are secured the ends of the principal wire $u$, which operates the distant signals or disks by means of the usual mechanism or connections $u'$, Figs. 1, 3, and 4. The wire $u$ passes from time to time over pulleys 18, Fig. 5, mounted in suitable boxes for supporting and guiding it, and the normal tension of this wire is obtained by means of counterweights 17 and $w$, Figs. 3, 4, and 9, the first of which also serves for returning the disk 16 into the line-clear position. Of course the counterweight 17 must be larger than the other and the traction-power for operating the disk 16 must be greater than the difference between these counterweights. The power of the spring $i$, interposed between the operating-lever $c$ and the first piston $k$ and the elasticity of which when it is compressed produces the traction of the wire, must be calculated accordingly.

In a normal condition—that is to say, when the pedal $a$ is raised or is not depressed—the wire $u$ may move freely, as the rack $y$ is not gripped by the jaws $r$. The expansion and contraction of this wire under the influence of variations of temperature may be compensated for, so that the effective length of the wire from the grip $r$ to the signal-disk remains constant, which is of great importance when the disk is at a considerable distance from the operating-pedal, taking into account the short stroke of the second piston $o$ in practice. With this object one end of the wire $u$, which ends in the free rack $y$, is carried over a pulley $v$, mounted permanently in front of the gripping-jaws $r$ on the wall of the box covering the mechanism, and is then brought back and attached to the said rack. It is easy to see that with this arrangement the wire may expand and contract without its effective length being modified—that is to say, that the same displacement of the piston $o$ will always produce a similar displacement of the disk or disks 16, because the weight $w$ will move the rack so as to compensate for the expansion.

In the modification of construction shown in Figs. 10 and 11 the lever $c$ of the pedal $a$ is connected, by means of a rod $j'$, (shown partially in elevation in Fig. 10 and partially in plan view in Fig. 11,) with the horizontal elbow-lever pivoting at $l^2$. The arm $m'$ of this lever acts elastically by the intermediary of springs $i'$ in order to move forward a rod $p'$, the opposite end $q'$ of which carries the grip $r$ for pulling the wire $u$. This rod $p'$, which is suitably guided at its end, traverses axially a cylinder $n'$, and this rod $p'$ and the rod $h'$ of a brake-cylinder connected to the arm $c$, Fig. 11, both carry two flexible diaphragms $k'$, of leather, which close the movable ends of the cylinders $n'$ and $d'$, to which they are attached so as to form a tight joint by means of flanged metallic pieces $k^2$, fixed to the cylinders by bolts. In other respects the brake-cylinder operates in the same manner as in the arrangement described in my previous patent aforesaid. As each diaphragm of cylinder $n'$ is thus displaced with the rod $p'$, it plays the part of a piston for the liquid filling said cylinder, which latter is further divided into two compartments by a transverse partition $e'$, provided with a narrow aperture $o^2$ and with a much larger aperture $o^3$, which is fitted with a valve $o^4$, arranged as shown in Fig. 10. The flexible-jawed grip $r$, mounted on the end $q'$ of the rod $p'$, acts, as hereinbefore stated, for engaging a rack $y$, to which the wire $u$ is attached in the manner hereinbefore described. The working of the entire arrangement thus formed is easily understood. The depression of the pedal $a$ on the passage of the first wheel over the adjacent rail produces a sharp movement of the lever $l'$—that is to say, a compression of the springs $i'$ $i^2$—and as the hydraulic brake $d$ is operated in consequence of this depression the pedal remains temporarily depressed after the passage of the wheel. The springs $i'$ then remain compressed by the arm $m'$, and the power developed by these springs acts on the rod $p'$ and causes it to advance. In consequence of the interposition of the cylinder $n'$ the advancing movement of this rod is retarded, because a portion of the liquid contained in the rear compartment of said cylinder must pass into the front compartment through the small aperture $o^2$. The sudden action of the pedal stored up by the springs $i^2$ thus produces a slow movement of the rod $p'$, which thus effects the traction of the cable $u$ of the signals without shock, closing the latter gently. At the same time as it actuates the arrangement for pulling the cable the pedal $a$ also produces the operation of the hydraulic brake, and by this circumstance it is held stationary for a short time, as has been hereinbefore mentioned. This brake acts in the same way as that described in my previous patent aforesaid. The liquid being in the part $d'$ of the cylinder $d$ is, in fact, partly forced back to the other side of a valve-plate $g$, while a very shallow notch $e'$ in the rod $h'$ comes into the orifice $f$ of the said valve-plate and comes into line with the opposite face of the latter.

In order that the rise of the pedal may be produced under the action of a recoil-spring $i^2$, it is necessary for the rod $h'$ to return to its normal position—that is to say, that the liquid previously forced back into the part $d^2$ of the cylinder $d$ may return to the part $d'$. This return can only take place through the very narrow passage of the notch $e'$, and will therefore be effected in an extremely-slow manner during the sliding of this notch in the valve-plate and then more rapidly as soon as the larger notch $e$ is in the said plate. On the contrary, the return of the liquid which has been slowly forced through the aperture $o^2$ into the front compartment of the cylinder $n'$ will take place without retardation through the aperture $e^3$ of larger section by raising the valve $o^4$. The signal or signals operated by the cable $u$ and which were previously closed for the passage of the train over the pedal $a$ thus remain at "danger" during the period of the release of the said pedal after the passage of the train—that is to say, during the time that the notch $e'$ occupies in sliding through the valve-plate $g$—and then the signals are drawn off under the action of the counterweight, so that the liquid forced into $d^2$ can return rapidly into $d'$ by traversing the passage in the valve-plate by the large notch $e$. Of course the notch $e'$ is calculated in such a way that the pedal remains depressed—that is to say, that the rear signals are kept blocked after the passage of the train for such a time that the following train is always kept at the regulation distance from the preceding one and cannot run into it from the rear. The arrangement of the cylinder $n'$ thus plays the part of a retarding device when the cable $u$ is pulled under the action of the pedal $a$, while the cylinder arrangement $d$ plays the part of the releasing-brake for enabling said pedal to rise after a time—that is to say, to allow of the opening of the signals which were previously closed.

In order to operate each disk 16, the traction-wire $u$ or the connecting mechanism $u'$ is attached to the end of a lever-arm 15, provided at the base of the vertical rotary shank of the disk 16, Figs. 3 and 4. The connection of the wire $u$ and the arm 15 is preferably made by means of a strong spring 14, with the object of obtaining a flexible movement in bringing the disk into the stop position. (Shown in dotted lines, Figs. 3 and 4.) At the end of each half-section of line in the direction in which the train is traveling there is the pedal which operates the disk or disks covering this half-section, Fig. 1. Near or in front of the said pedal is placed the disk covering the rear of the following half-section, which disk is operated from a distance by the pedal which operates this next half-section, and so on successively.

When the advance disk at the rear of a half-section has been brought into the stop position by the depression of the corresponding pedal on the passage of a train, it remains blocked in this position by the action of the retarding-brake $d$, which maintains the pedal depressed for a period of time which may be adjusted, but which is sufficient to enable the train to travel over the second half-section. This hydraulic brake, the working of which was described in my previous patent hereinbefore mentioned and has also been described with reference to the present arrangement, allows an almost imperceptible rise of the pedal to take place at first without altering the position of the disk, but after the predetermined time allows a rapid rise of the pedal to take place, which causes the return of the disk to the "line-clear" position, the train being then in the next section.

In the event of an accidental prolonged stoppage of the train on the main line it is evident I can no longer count on the automatic protection by the stop-disks, seeing that these latter will only remain blocked for the time arranged and then will automatically return to the line-clear position. In order, however, to insure protection by means of the said disks for the train thus stopped on the main line, an arrangement for blocking the signals from a distance in the danger position is provided, and this must act during all the time the train is stopped. This supplementary means consists of blocking-boxes 19, Fig. 6, arranged at intervals along the line, through which boxes the wires acting on the disks pass. The wires in running through each box 19 pass between two plates, the lower one of which is fixed and the upper one 20 is movable and may be approached to the fixed plate by means of a pressure-screw 21, engaging in a lower fixed nut 22. By tightly screwing up this pressure-screw by means of a special key which the train officials possess one or more of the wires $u$ are blocked between the two plates, and the disks operated by said wires and which are evidently then at "danger" are thus locked or blocked in this position. The blocking-boxes being provided in sufficient number along the line, it will be evident that the train officials need only run a very short way in front of or at the rear of the train to reach one of these boxes and block the disks at a distance instead of having to go and stand at three hundred to four hundred meters from the train, as prescribed by the rules at present in force on similar automatic systems.

In order to release the signals when the train resumes its journey, it is evident that it is sufficient to slacken the screw 21 in order to release the wire or wires $u$. I have also provided a special semi-automatic system for protecting the movement of trains on branch tracks or station-sidings in order to provide against any carelessness of the person directing the shunting and to leave upon this person the whole responsibility. This special arrangement, Figs. 12 and 13, is such that the distance signal or disk 16 of the main line is closed and remains locked during the whole time that the shunting lasts on one of the other lines. For this purpose a pedal mechanism is provided at each branch toward the inside. Each of these mechanisms operates a wire attached to the wire of the main line, and consequently actuates the distance signal-disk 16 of said line. The piston-rod $q$, Fig. 13, also pulling on this additional wire acts on an elbow-lever 24, pushing a bolt or plate 25, which operates a check-disk 23, the position of which at all times corresponds with that of the principal signal-disk. When the advance signal is closed by the depression of the pedal, this plate 25 is pushed and closes the check-signal 23, and a catch 26, beneath which the plate slides, then falls into a corresponding notch 27 in the plate, so that the two disks are permanently blocked and cannot be unblocked except by the person in charge of the shunting, who must in order to unblock them raise the catch or latch 26. It is evident that the pedal of each shunting-line may operate independently of the single advance signal-disks, the wires of the other pedals being then loose.

In case the amount of traffic does not require the use of the complete system a simplified system may suffice, in which the disk, whether a single or double one, is arranged at the side of the pedal. The short length of wire operating the disk enables said wire to be directly attached to an arm $r$ on the piston-rod $q$, Fig. 14, without employing the rack arrangement or the arrangement for compensating for expansion.

In order to produce the automatic stoppage of a train when the track-signal is closed, (at "danger,") a supplementary arrangement may be fitted to the locomotive with a view to mechanically operating mechanisms on the engine—such as the regulator, the cock of the Westinghouse brake, the alarm-whistle, or the like—by the action of the signal-disk itself. A form of construction of this arrangement is shown in Figs. 15 and 16 and is as follows: A horizontal lever, the arm 28 of which projects laterally from the engine, may pivot on a vertical axis 29, provided on the side of the driver's cab, and said horizontal lever is engaged by the arm 47 of the disk 16 when the track is not clear. A toothed ring 30, formed on said lever, engages a rack 32, which is displaced in the direction indicated by the arrow when the arm 28 is operated and which is then locked by means of a pawl 34 dropping into a notch 33. Three wires or cables 35 36 37, passing over pulleys and serving as means of transmission for the mechanical operation of the alarm-whistle 46, regulator 45, and the cock 44, causing the brake to come into action, are attached to the arm 31 of the lever hereinbefore mentioned. The alarm-whistle and the regulator may be suddenly operated by the traction of the respective cables, while the tap of the brake must be actuated progressively in order not to cause too sudden a shock, which might result in the breakage of couplings or like accidents. For this object the cable 37 actuates the handle 42 of the tap 44 by means of a hydraulic retarding device 48, similar to the one hereinbefore described and shown in Fig. 10. The traction of this cable is exerted at the end of the lever 38, pivoting at 39 and acting on the rod 41 of the retarding device by means of a spring 40. The sudden movement of the arm 28 is thus converted into a progressive movement of the rod 41, actuating the tap by a rounded head 42. The speed of movement of said rod 41 can of course be varied by altering the section of the aperture 51. The movement of the arm 28 may further produce the explosion of a bomb or fog-signal 50, arranged on an anvil 49 and which is crushed by the end of the rod 32.

In the foregoing it has been assumed that the train was to be protected simply from the rear; but it is quite evident that the system also allows of the train being protected in both directions where the line is a single one, as shown in Fig. 1. It is also evident that the apparatus and arrangements hereinbefore described may be applied not only to the automatic operation of signals, but they are also suitable for operating from a distance railway-crossing barriers or gates. This apparatus and arrangement thus enables the staff supervising the lines to be almost entirely dispensed with without interfering with the running of the trains.

I declare that what I claim is—

1. In a safety device for railways, an automatic signaling apparatus comprising, a pedal-lever adapted to be depressed by the wheel of a vehicle on the railway, a hydraulic pump, a spring connecting means between the piston-rod of said pump and the pedal-lever, a hydraulic brake constructed in such manner as to allow of a quick out movement but to retard the return movement, positive connecting means between the piston-rod of said brake and the pedal-lever, signaling apparatus, and means actuated by the hydraulic pump aforesaid for operating said apparatus.

2. In a safety device for railways, an automatic signaling apparatus comprising two hydraulic cylinders, a piston consisting of a flexible diaphragm at each end of each cylinder, a piston-rod in each cylinder connected to both diaphragm-pistons thereof, means in one of said cylinders adapted to retard the outward movement of its piston-rod, signaling apparatus and means connected to said piston-rod for operating said apparatus, means in the other of said cylinders adapted to retard the return movement of its piston-rod for a predetermined time; a device adapted to be operated by the wheel of a vehicle on the railway, positive connecting means between said device and the piston-rod of the latter cylinder, spring connecting means between said device and the piston-rod of the former cylinder, and means tending to return said devices to their normal positions.

3. In a safety device for railways, the combination of a signal, a rack, connecting means between said signal and said rack, a grip adapted to engage said rack, a guide for said grip formed in such manner as to bring the grip into engagement with the rack at a certain point, and means connected to said grip and adapted to be actuated by the wheels of vehicles on the railway whereby the grip may be moved, the rack engaged and moved, and the signal operated.

4. In a safety device for railways, the combination of a signal, a rack, connecting means between said signal and said rack, a grip adapted to engage said rack, a guide for said grip, formed in such manner as to bring the grip into engagement with the rack at a certain point, operating means connected to said grip, and a counterweight connected to said rack, whereby alterations in the length of the connecting means between the signal and rack aforesaid are compensated.

5. In a safety device for railways the combination of a signal a connection for operating said signal, a device adapted to be operated by the wheels of vehicles on the railway, means for engaging said device with the connection which operates the signal, a counterweight connected to said engaging means, whereby alterations in the length of the connection for operating the signal is compensated, a second signal, a flexible connection for operating said second signal, and pulleys whereby said flexible connection is brought to the engaging means aforesaid in such manner that both signals may be operated simultaneously.

6. In a safety device for railways, the combination with a signal, means adapted to be operated by the wheels of vehicles on the railway in such manner as to produce a movement in one direction and after a time a return movement, and connecting means between the signal and said means aforesaid operated by the wheels of vehicles, of a box, two plates therein between which plates the connecting means for the signal passes, and means for pressing one of said plates upon the other, whereby the connecting means aforesaid to the signal may be gripped and the return of the signal delayed until the grip is released.

7. In a safety device for railways, the combination with a signal, and operating means therefor adapted to be operated by the wheels of vehicles on the railway, of a rod connected to the signal, a notch in said rod, and a catch adapted to engage automatically in said notch, whereby the signal may be held closed until released by an official raising the catch.

8. In a safety device for railways, the combination with a signal and means adapted to be operated by the wheels of vehicles on the railway for automatically moving said signal, of a flexible arm connected to said signal, a locomotive having a whistle, regulator, and brake-applying apparatus, a lever on the locomotive adapted to be engaged by said flexible arm, positive connecting means between said lever and the whistle and regulator of the locomotive, and a spring and hydraulic brake-cylinder connecting said lever with the brake-applying handle on the locomotive.

In witness whereof I have hereunto signed my name, this 10th day of December, 1902, in the presence of two subscribing witnesses.

SAVA ROGOZEA.

Witnesses:
S. PARETTE,
GREGORY PHELAN.